United States Patent
Chung et al.

(10) Patent No.: US 9,395,746 B2
(45) Date of Patent: Jul. 19, 2016

(54) SIGNAL COMPARISON APPARATUS AND METHOD OF CONTROLLING SAME

(71) Applicant: Industrial Technology Research Institute, Hsinchu (TW)

(72) Inventors: Yung-Hui Chung, Hsinchu (TW); Bo-Wei Chen, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/729,063

(22) Filed: Jun. 3, 2015

(65) Prior Publication Data

US 2016/0161978 A1    Jun. 9, 2016

(30) Foreign Application Priority Data

Dec. 8, 2014 (TW) .............................. 103142598 A

(51) Int. Cl.
*G06F 1/04* (2006.01)
*G06F 1/10* (2006.01)

(52) U.S. Cl.
CPC ........................................ *G06F 1/10* (2013.01)

(58) Field of Classification Search
CPC ........................................................ G06F 1/10
See application file for complete search history.

(56) References Cited

U.S. PATENT DOCUMENTS

| | | | |
|---|---|---|---|
| 6,031,886 A | 2/2000 | Nah et al. | |
| 6,304,107 B1 | 10/2001 | Savage et al. | |
| 6,384,619 B1 | 5/2002 | Kim et al. | |
| 6,603,415 B1 | 8/2003 | Somayajula | |
| 6,876,318 B2 | 4/2005 | Mulder et al. | |
| 7,282,489 B2 | 10/2007 | Levy et al. | |
| 7,623,051 B2 | 11/2009 | Murden et al. | |
| 7,898,453 B2 | 3/2011 | Mathe | |
| 8,028,210 B2 | 9/2011 | Kurimoto | |

(Continued)

FOREIGN PATENT DOCUMENTS

| | | |
|---|---|---|
| CN | 100401262 | 7/2008 |
| CN | 103176029 | 6/2013 |

(Continued)

OTHER PUBLICATIONS

Cho et al., "A Two-Channel Asynchronous SAR ADC with Meta-stable-Then-Set Algorithm," IEEE Transactions on Very Large Scale Integration (VLSI) Systems, Apr. 2011, pp. 765-769.
Chen et al., "A 6-bit 600-MS/s 5.3-mW Asynchronous ADC in 0.13 μm CMOS," IEEE Journal of Solid-State Circuits Conference, Dec. 2006, pp. 2669-2680.

(Continued)

*Primary Examiner* — Daniel Puentes
(74) *Attorney, Agent, or Firm* — Jianq Chyun IP Office

(57) ABSTRACT

A signal comparison apparatus and a method of controlling the same are provided. The signal comparison apparatus includes a first comparator, a self-timed clock generator and a controller. The first comparator is controlled by a start signal to compare differences of first input signals and generate output signals. The self-timed clock generator receives the output signals to generate a self-timed clock signal. The controller receives the self-timed clock signal and calculates a time interval of the self-timed clock signal which responds to the first input signals of the first comparator, and determines whether the time interval is equal to or larger than a threshold time to generate a metastable detection signal. When the time interval is equal to or larger than the threshold time, the controller outputs the metastable detection signal as the start signal, such that the first comparator continue comparing the next differences of the first input signals.

24 Claims, 11 Drawing Sheets

(56) References Cited

U.S. PATENT DOCUMENTS

| | | | |
|---|---|---|---|
| 8,344,925 | B1 | 1/2013 | Evans |
| 8,482,449 | B1 | 7/2013 | Zabroda |
| 8,538,362 | B2 | 9/2013 | Srivastava et al. |
| 8,957,802 | B1 * | 2/2015 | Evans ................. H03M 1/0863 341/155 |
| 2005/0246613 | A1 | 11/2005 | Blaauw et al. |
| 2013/0169360 | A1 | 7/2013 | Gupta et al. |
| 2014/0022105 | A1 | 1/2014 | Chen et al. |

FOREIGN PATENT DOCUMENTS

| | | |
|---|---|---|
| CN | 103376397 | 10/2013 |
| EP | 0539129 | 12/1996 |
| EP | 0961410 | 7/2003 |
| WO | 2009134312 | 11/2009 |

OTHER PUBLICATIONS

Kang et al., "A 12b 11MS/s successive approximation ADC with two comparators in 0.13 μm CMOS," Symposium on VLSI Circuits, Jun. 16-18, 2009, pp. 240-241.

Shikata et al., "A 0.5V 1.1MS/sec 6.3fJ/conversion-step SAR-ADC with tri-level comparator in 40nm CMOS," IEEE Journal of Solid-State Circuit, Apr. 2012, pp. 1022-1030.

Figueiredo, "Comparator Metastability in the Presence of Noise," IEEE Transactions on Circuits and Systems I: Regular Papers, May 2013, pp. 1286-1299.

Yang et al., "A 1 GS/s 6 Bit 6.7 mW Successive Approximation ADC Using Asynchronous Processing," IEEE Journal of Solid-State Circuits, Aug. 2010, pp. 1469-1478.

Office Action of Taiwan Counterpart Application, issued on May 3, 2016, p. 1-p. 3.

* cited by examiner

SIGNAL COMPARISON APPARATUS AND METHOD OF CONTROLLING SAME

CROSS-REFERENCE TO RELATED APPLICATION

This application claims the priority benefit of Taiwan application serial no. 103142598, filed on Dec. 8, 2014. The entirety of the above-mentioned patent application is hereby incorporated by reference herein and made a part of this specification.

TECHNICAL FIELD

The technical field relates to a signal comparison apparatus and a method of controlling the same.

BACKGROUND

Comparator-based Analog-to-Digital Converter (ADC) has always been a very popular research topic, such as ADCs having various architectures like Flash, Folding, Successive Approximation Register (SAR) and Sub-Ranging, etc. Since a Comparator-based ADC has characteristics of high speed, high resolution, low power consumption, and small area which will be more apparent with the progress in advanced semiconductor manufacturing techniques, such ADCs are indeed suitable for system integration. In addition, in cooperation with a self-timed timing control mechanism, the circuit complexity of the clock signal generator within the ADC is simplified, and a sampling rate of the ADC is increased. Therefore, self-timed comparator-based ADC has gradually become one of the technical focuses that researchers compete in developing.

However, when a self-timed comparator compares input signals while the input difference of the input signals is close to zero, the self-timed comparator is not able to successfully generate a comparison result within a required time interval. Thereby, the self-timed comparator enters a Metastable State. When the self-timed comparator enters the Metastable State, generation of a next self-timed signal is seriously delayed, which thereby affects the timing in the operation of the system and enhances the Bit Error Rate (BER) of the system. Therefore, how to reduce the probability of the self-time comparator entering the Metastable State is the major key to whether a self-timed system is able to run normally for a long time.

SUMMARY

The disclosure provides a signal comparison apparatus and a method of controlling the same, which prevent the signal comparator apparatus from entering a Metastable State for a long time.

One of exemplary embodiments of the disclosure provides a signal comparison apparatus. The signal comparison apparatus includes a first comparator, a self-timed clock generator, and a controller. The first comparator receives at least two first input signals. The first comparator is controlled by a start signal. The first comparator compares differences of the at least two first input signals to generate an output signal based on the start signal. The self-timed clock generator is coupled to the first comparator to receive the output signals and generates a self-timed clock signal according to the output signals. The controller is coupled to the self-timed clock generator to receive the self-timed clock signal. The controller calculates a time interval of the self-timed clock signal, wherein the time interval responds to the at least two first input signals of the first comparator. The controller determines whether the time interval is equal to or larger than a threshold time and generates a metastable detection signal based on determination result. When the time interval is equal to or larger than the threshold time, the controller outputs the metastable detection signal as the start signal to enable the first comparator to continue comparing the next differences of the at least two first input signals.

One of exemplary embodiments of the disclosure provides a method of controlling a signal comparison apparatus. The method includes: receiving at least two first input signals; comparing the differences of the at least two first input signals to generate an output signal based on the start signal; generating a self-timed clock signal according to the output signal; calculating a time interval of the self-timed clock signal, wherein the time interval responds to the at least two first input signals, and determining whether the time interval is equal to or larger than a threshold time; and generating a metastable detection signal based on the determined result. When the time interval is equal to or larger than the threshold time, the metastable detection signal is selected as the start signal to enable the signal comparison apparatus to continue comparing the next differences of the at least two first input signals.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
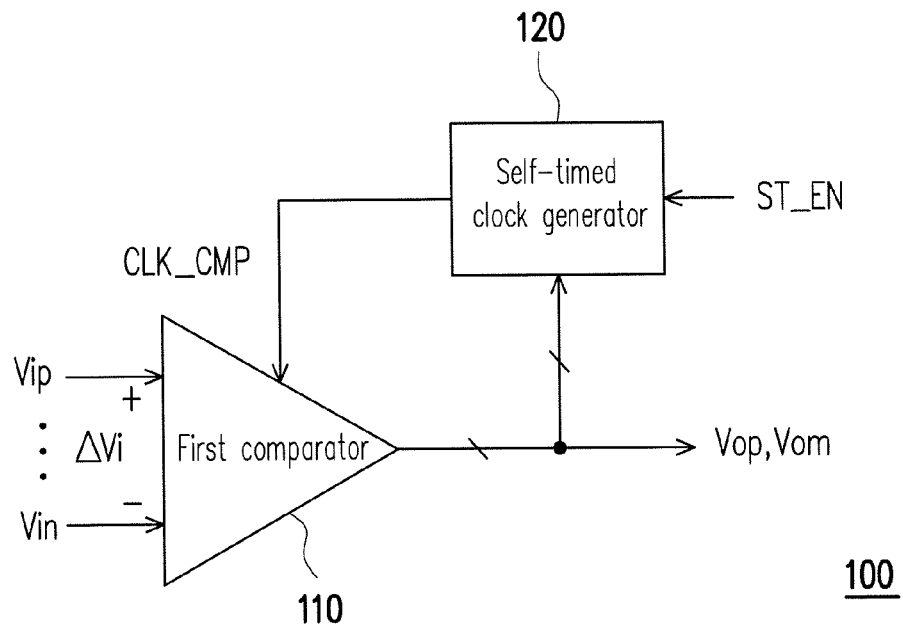
FIG. 1 is a block diagram of a signal comparison apparatus according to an exemplary embodiment.

Referring to FIG. 1, FIG. 1 is a block diagram of a signal comparison apparatus 100. The signal comparison comparator 100 includes a first comparator 110 and a self-timed clock generator 120. The first comparator 110 receives first input signals and compares differences of the first input signals. The first input signals may be voltage signals or current signals, but the disclosure is not limited thereto. In this embodiment, the first input signals received by the first comparator 110 includes first input signals Vip and Vin, wherein a first input difference between the first input signals Vip and Vin is $\Delta Vi$. In addition, the first comparator 110 may also compare more than two first input signals, and therefore the disclosure is not limited thereto. The first comparator 110 is controlled by a start signal CLK_CMP to determine an operation mode of the first comparator 110. The first comparator 110 compares the first input signals Vip and Vin to generate an output signal based on the operation mode. The output signal may be differential output signals Vop and Vom as shown in FIG. 1, but the disclosure is not limited thereto. The self-timed clock generator 120 is coupled to the first comparator 110 to receive the differential output signals Vop and Vom and performs logic operations on the differential output signals Vop and Vom to generate a next start signal CLK_CMP. In addition, the self-timed clock generator 120 may also be controlled by an enable signal ST_EN to turn the signal comparison apparatus 100 on or off, but the disclosure is not limited thereto.

Figure 2:
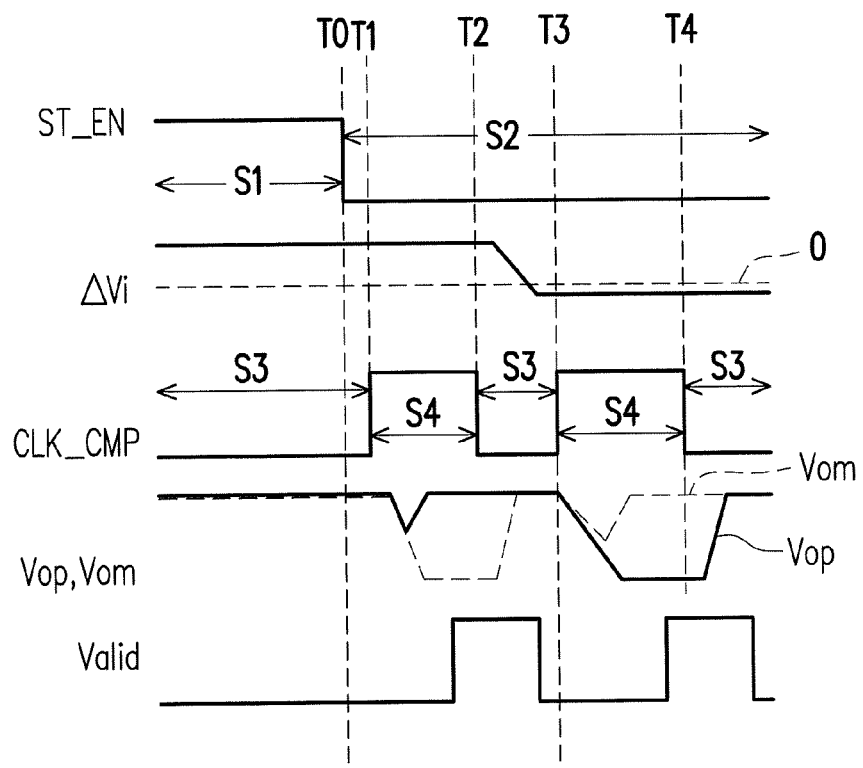
FIG. 2 is a timing diagram of the signal comparison apparatus as shown in FIG. 1 according to an exemplary embodiment.

FIG. 2 is a timing diagram of the signal comparison apparatus 100 as shown in FIG. 1. Referring to both FIGS. 1 and 2, before a time T0 of FIG. 2, since the enable signal ST_EN is under a disabled state 51 (for example, a logic high level), the signal comparison apparatus 100 is turned off. At this point, the start signal CLK_CMP generated by the self-timed clock generator 120 is under a reset state S3 (for example, a logic low level), so that the first comparator 110 operates in a reset mode. It is noted that the differential output signals Vop and Vom of the first comparator 110 are reset on a fixed logic level. For example, the differential output signals Vop and Vom may be pulled up to the logic high level, or the differential output signals Vop and Vom may be pulled down to the logic low level. After the time T0, since the enable signal ST_EN is converted to an enable state S2 (for example, a logic low level), the signal comparison apparatus 100 is turned on and enters a comparison state S4 (for example, a logic high level). After the signal comparison apparatus 100 is turned on, the first comparator 110 performs signal comparison of a discrete time between the first input signals Vip and Vin. That is, the first comparator 100 operates in two modes, one of which is a comparison mode while the other is the reset mode. For instance, in this embodiment, when the start signal CLK_CMP is under a logic high level, the first comparator 110 is in the comparison mode; when CLK_CMP is under a logic low level, the first comparator 110 is in the reset mode. In the meantime, the self-timed clock generator 120 continuously receives the differential output signals Vop and Vom of the first comparator in a manner of continuous time to perform logic operation and generate a mode control signal CLK_CMP.

When the signal comparison apparatus 100 is turned on (that is, after the time T0 of FIG. 2), the start signal CLK_CMP is converted from the logic low level to the logic high level, so that the first comparator 110 enters the comparison mode from the reset mode. When the first comparator 110 operates in the comparison mode, the first comparator 110 begins to compare the first input signals Vip and Vin, that is, compare the first input difference $\Delta Vi$ between the first input signals Vip and Vin. Between the times T1 and T2, since $\Delta Vi$ is larger than 0, the differential output signal Vop of the first comparator 110 maintains in the logic high level while the differential output signal Vom is pulled down to the logic low level. Next, the self-timed clock generator 120 receives the differential output signals Vop and Vom of the first comparator 110 to perform logic operation and generate internally a valid comparison signal Valid, wherein the valid comparison signal Valid is for indicating whether the first comparator 110 completes the comparison. When the valid comparison signal Valid is converted from the logic low level to the logic high level, that means the first comparator 110 at this point has completed the comparison. Therefore, the start signal CLK_CMP generated by the self-timed clock generator 120 is converted from the logic high level to the logic low level, so that the first comparator 110 enters the reset mode from the comparison mode. Assuming the first comparator 110 is a Pull-High Reset comparator, the differential output signals Vop and Vom of the first comparator 110 will be pulled up to the logic high level when the first comparator 110 operates in the reset mode. After the first comparator 110 completes the reset, that is, when the differential output signals Vop and Vom of the first comparator 110 have all been pulled up to the logic high level, the valid comparison signal Valid inside the self-timed clock generator 120 is converted from the logic high level to the logic low level. Next, the valid comparison signal Valid converts the start signal CLK_CMP again from the logic low level to the logic high level via a logic circuit inside the self-timed clock generator 120, so that the first comparator 110 operates in the comparison mode again to compare the next first input signals Vip and Vin. Similarly, between times T3 and T4, since the first input difference $\Delta Vi$ is smaller than 0, the differential output signal Vop of the first comparator 110 is pulled down to the logic low level while the differential output signal Vom maintains at the logic high level. At this point, the self-timed clock generator 120 receives the differential output signals Vop and Vom of the first comparator 110 to perform logic operation and generate the valid comparison signal Valid internally. Meanwhile, the valid comparison signal Valid is converted from the logic low level to the logic high level, which means the first comparator 110 at this point has completed the comparison. Therefore, the start signal CLK_CMP generated by the self-timed clock generator 120 is converted from the logic high level to the logic low level, so that the first comparator 110 enters the reset mode from the comparison mode. The signal comparisons continue until the signal comparison apparatus 100 is turned off, that is, until the enable signal ST_EN is converted from the logic low level to the logic high level.

Figure 3A:
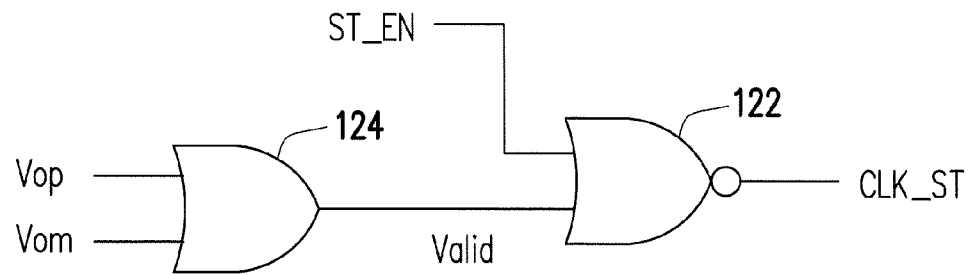
FIGS. 3A and 3B are circuit diagrams of a self-timed clock generator of the signal comparison apparatus as shown in FIG. 1 according to an exemplary embodiment.
Figure 3B:
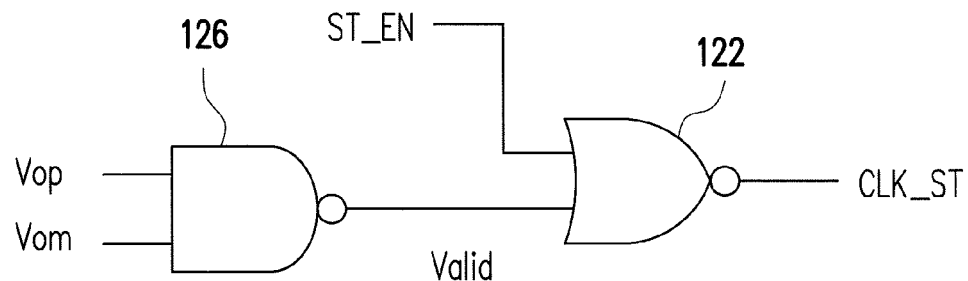

To realize the operation timing of the signal comparison apparatus 100 as shown in FIG. 2, a self-timed clock generator is provided in an embodiment of the disclosure, which is shown in FIGS. 3A and 3B. FIGS. 3A and 3B are circuit diagrams of a self-timed clock generator 120 of the signal comparison apparatus 100 as shown in FIG. 1. It is assumed in the self-timed clock generator 120 as shown in FIG. 3A that the first comparator 110 is in the reset mode, and the differential output signals Vop and Vom are in a Pull-Low Reset form. Referring to FIG. 3A, the self-timed clock generator 120 includes an OR-gate 124 and a NOR-gate 122. The OR-gate 124 receives the differential output signals Vop and Vom to generate the valid comparison signal Valid. The NOR-gate 122 receives the enable signal ST_EN. The NOR-gate 122 is coupled to the OR-gate 124 to receive the valid comparison signal Valid and generate a self-timed clock signal CLK_ST, wherein the self-timed clock generator 120 outputs the self-timed clock signal CLK_ST as the start signal CLK_CMP.

The differential output signals Vop and Vom of the self-timed clock generator 120 as shown in FIG. 3B are another implementation of the Pull-High Reset form assuming that the first comparator 110 is in the reset mode. Referring to FIG. 3B, the self-timed clock generator 120 includes a NAND-gate 126 and the NOR-gate 122. The NAND-gate 126 receives the differential output signals Vop and Vom to generate the valid comparison signal Valid. The NOR-gate 122 receives the enable signal ST_EN. The NOR-gate 122 is coupled to the NAND-gate 126 to receive the valid comparison signal Valid and generate the self-timed clock signal CLK_ST, wherein the self-timed clock generator 120 outputs the self-timed clock signal CLK_ST as the start signal CLK_CMP. The operation of the self-timed clock generator 120 as shown in FIGS. 3A and 3B may be referred in the description about FIG. 2 and is not repeated herein.

Referring to FIGS. 1 and 2 again, when the first input difference ΔVi of the first comparator 110 changes, a pulse width of the start signal CLK_CMP generated by the self-timed clock signal 120 also changes. More accurately, the pulse width of the start signal CLK_CMP is in reverse proportion to the value of the first input difference ΔVi of the first comparator 110. That is, when the first input difference ΔVi of the first comparator 110 is smaller, the pulse width of the start signal CLK_CMP is wider, and the reverse is also true.

Figure 4:
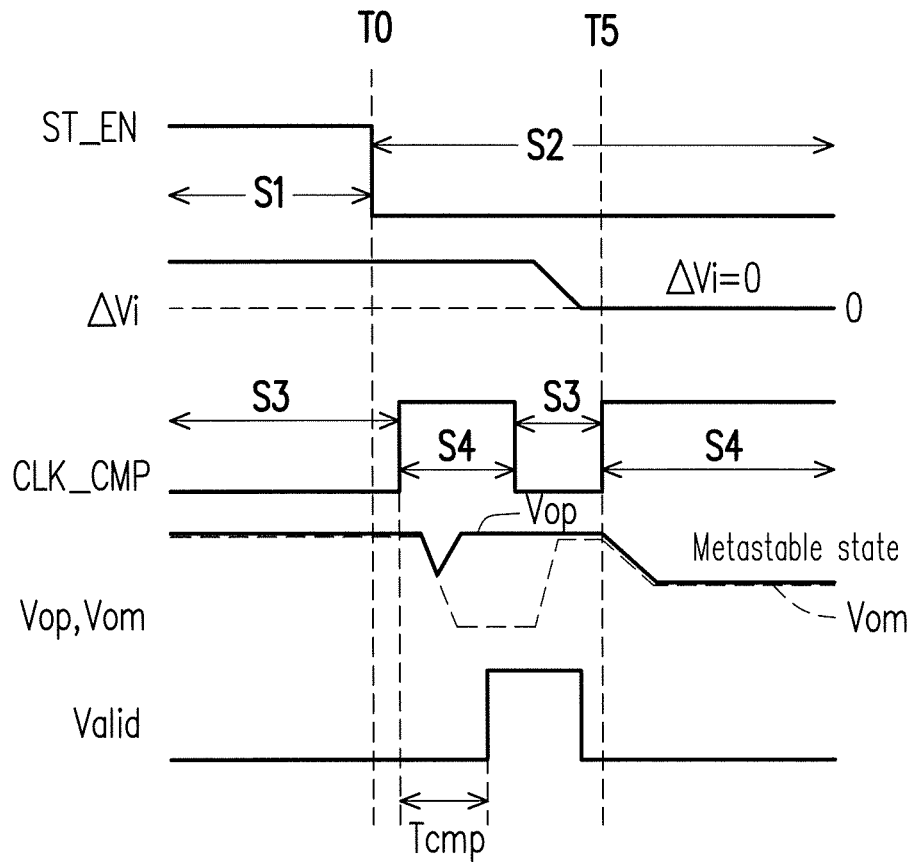
FIG. 4 is another timing diagram of the signal comparison apparatus as shown in FIG. 1 according to an exemplary embodiment.

Therefore, if the first input difference ΔVi of the first comparator is zero or close to zero, the pulse width of the start signal CLK_CMP is close to infinity. A detailed description about the above condition is provided below. FIG. 4 is another timing diagram of the signal comparison apparatus 100 as shown in FIG. 1. Referring to both FIGS. 1 and 4, the operation of the signal comparison apparatus 100 before a time T5 is similar to the operation before the time T3 in FIG. 2 and is not repeated herein. It is noted that after the time T5, since the first input difference ΔVi of the first comparator 110 equals zero, the first comparator 110 is not able to compare and know which first input signal is larger and thus enters a metastable state. That is, the first comparator 110 makes an output voltage difference of the differential output signals Vop and Vom thereof too small. Thereby, the valid comparison signal Valid inside the self-timed clock generator 120 may possibly be still at the logic low level, so that the start signal CLK_CMP generated by the self-timed clock generator 120 maintains always at the logic high level. Thus, before the first comparator 110 leaves the metastable state, the first comparator 110 continuously maintains in the comparison mode without returning to the reset mode, and thereby the next comparison of the first input signals cannot be performed.

Figure 5:
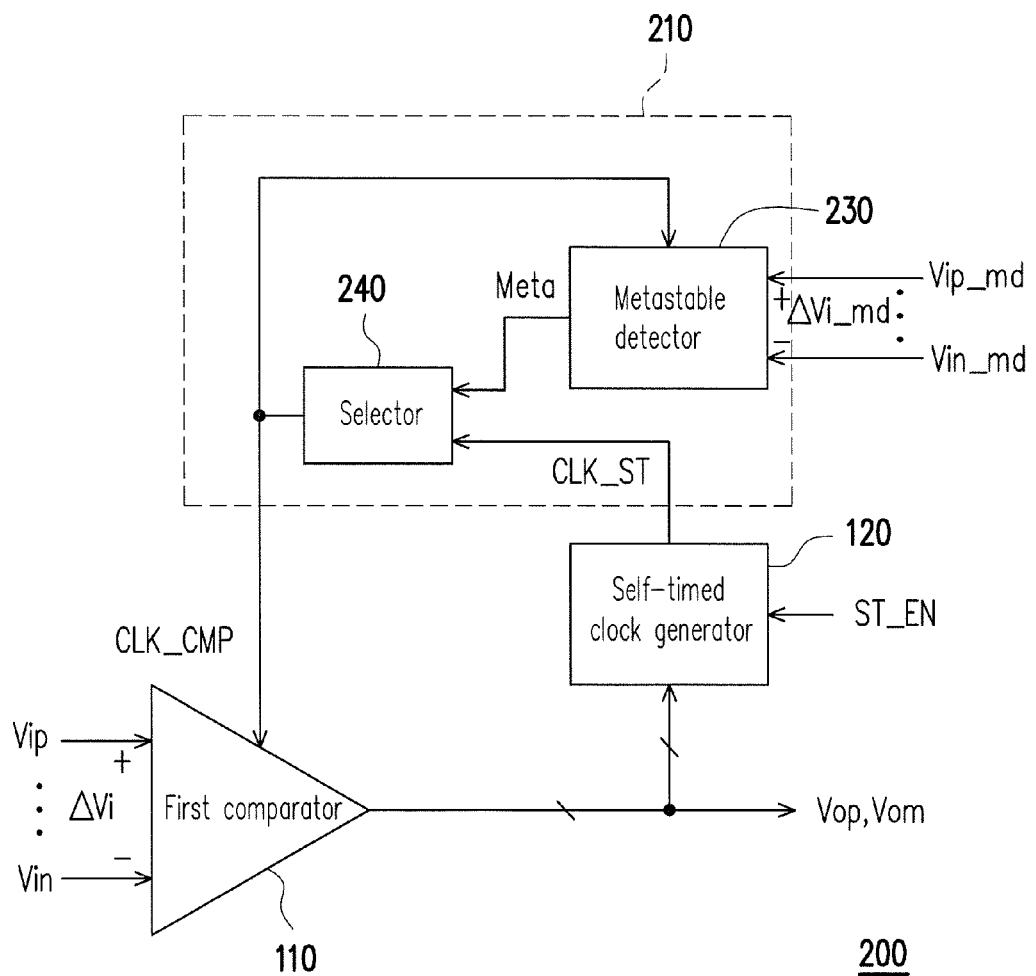
FIG. 5 is a signal comparison apparatus having a metastable detection mechanism according to an exemplary embodiment.

To make the signal comparison apparatus 100 be able to successfully leave the metastable state after entering the metastable state, a signal comparison apparatus having a metastable detection mechanism is provided in an embodiment of the disclosure. Referring to FIG. 5, FIG. 5 is a signal comparison apparatus 200 having the metastable detection mechanism according to an embodiment of the disclosure. The signal comparison apparatus 200 includes a first comparator 110, a self-timed clock generator 120, and a controller 210. The first comparator 110 receives first input signals Vip and Vin. Since the first comparator 110 may also compare more than two first input signals, the disclosure is not limited thereto. The first comparator 110 is controlled by a start signal CLK_CMP to determine an operation mode thereof. The first comparator compares the first input signals Vip and Vin to generate output signals based on the start signal CLK_CMP, wherein this output signal may be differential output signals Vop and Vom as shown in FIG. 5. However, the disclosure is not limited thereto. A self-timed clock generator 120 is coupled to the first comparator 110 to receive the output signals (such as differential output signals Vop and Vom) and generates a self-timed clock signal CLK_ST according to the output signals.

In implementation, the first comparator 110 and the self-timed clock generator 120 disclosed in FIG. 5 may be equivalent to the first comparator 110 and the self-timed clock generator 120 as shown in FIG. 1. Therefore, operations thereof may be referred to the description about FIG. 1 and is not repeated herein again. The controller 210 is coupled to the self-timed clock generator 120 to receive the self-timed clock signal CLK_ST. In addition, the controller 210 further receives at least two second input signals, such as second input signals Vip_md and Vin_md. It is learned from the description about FIG. 4 that when the first comparator 110 enters the metastable state, the self-timed clock signal CLK_ST generated by the self-timed clock generator 120 continuously maintains at a voltage level. Therefore, the controller 210 generates a metastable detection signal Meta based on a time interval that the self-timed clock signal CLK_ST is at this voltage level. That is, the controller 210 is able to calculate the time interval of the self-timed clock signal CLK_ST, and this time interval responds to the first input signals Vip and Vin of the first comparator 110. In addition, the controller 210 determines whether this time interval is equal to or larger than a threshold time and generates the metastable detection signal Meta based on the determined result. When the time interval is equal to or larger than the threshold time, it is recognized that the first comparator at this point has entered the metastable state. The controller 210 is able to output the metastable detection signal Meta as the start signal CLK_CMP, so that the first comparator 110 leaves the metastable state and continues to compare the next first input signals Vip and Vin. In contrast, when the time interval is smaller than the threshold time, the first comparator 110 at this point has not been recognized to enter the metastable state, the controller 210 selects the self-timed clock signal CLK_ST as the start signal CLK_CMP.

Referring still to FIG. 5, in the embodiment of the disclosure, the controller 210 may further receive at least two second input signals, such as second input signals Vip_md and Vin_md, but the disclosure is not limited thereto. However, for the convenience of description, the second input signals Vip_md and Vin_md are taken as examples for description. The controller 210 may include a metastable detector 230 and a selector 240. The metastable detector 230 receives the start signal CLK_CMP or the second input signals Vip_md and Vin_md, wherein the start signal CLK_CMP responds to the self-timed clock signal CLK_ST. In other words, based on the time interval that the self-timed clock signal CLK_ST is at the voltage level, the metastable detector 230 determines whether this time interval is equal to or larger than the threshold time so as to generate the metastable detection signal Meta. The selector 240 receives the self-timed clock signal CLK_ST. The selector 240 is coupled to the metastable detector 230 to receive the metastable detection signal Meta. When the time interval that the self-timed clock signal CLK_ST is at the voltage level is equal to or larger than the threshold time, the selector 240 selects the metastable detection signal Meta as the start signal CLK_CMP. When the time interval that the self-timed clock signal CLK_ST is at the voltage level is smaller than the threshold time, the selector 240 selects the self-timed clock signal CLK_ST as the start signal CLK_CMP. Herein, the threshold time responds to the start signal CLK_CMP or the second input signals Vip_md and Vin_md.

Figure 6:
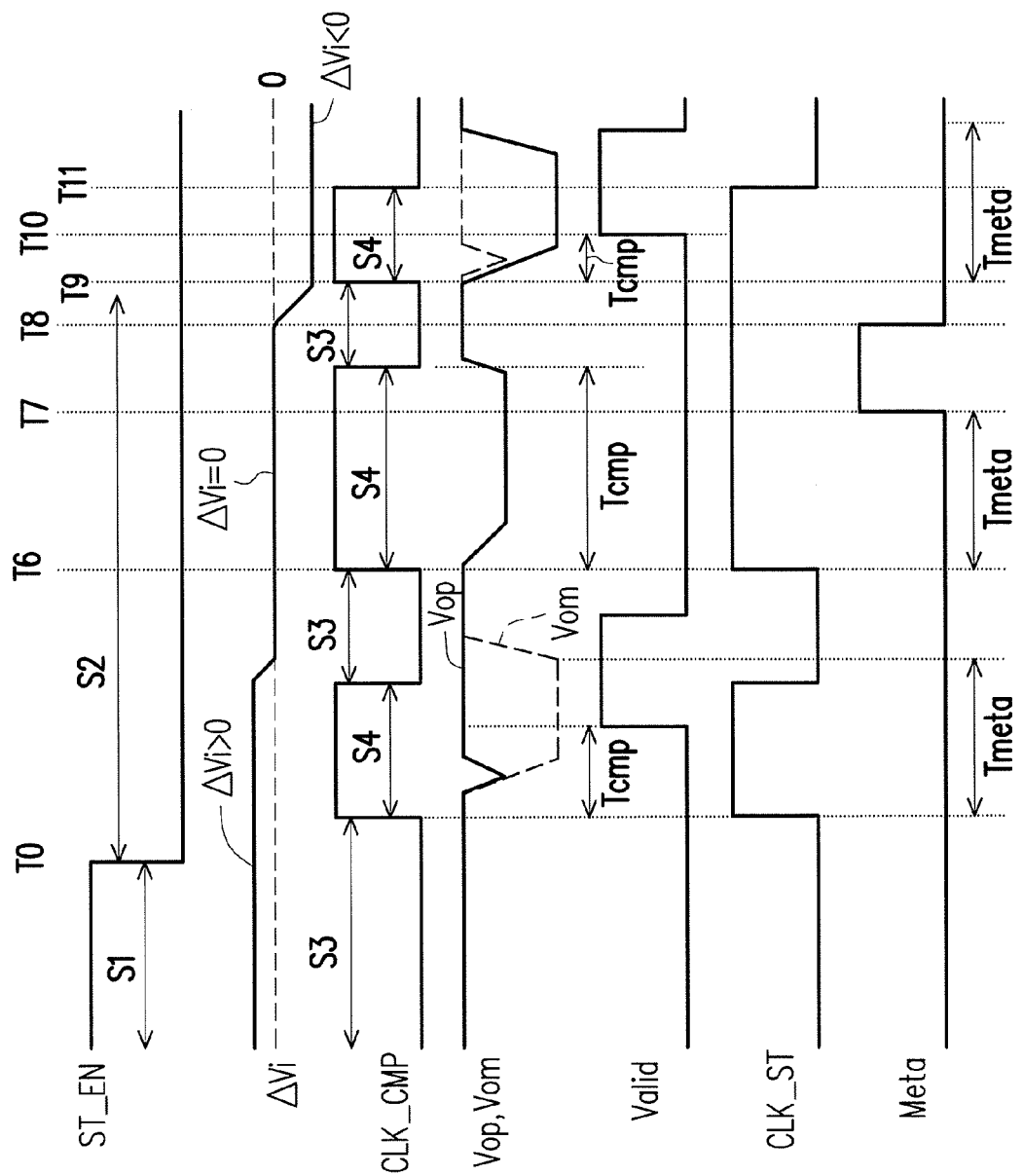
FIG. 6 is a timing diagram of the signal comparison apparatus as shown in FIG. 5 according to an exemplary embodiment.

FIG. 6 is a timing diagram of the signal comparison apparatus 200 having the metastable detection mechanism as shown in FIG. 5. Referring to both FIGS. 5 and 6, operations of the signal comparison apparatus 200 before a time T6 is similar to the operations before the time T3 in FIG. 2. Therefore, the operations may be referred to the description about FIG. 2, and the details are not repeated herein. However, it is noted that two signals not presented in FIG. 2 are added in FIG. 6, which are respectively the self-timed clock signal CLK_ST and metastable detection signal Meta. Between the times T0 and T6, since the first comparator 110 has not entered the metastable state, that is, the metastable detector 230 determines that a time interval Tcmp that the self-timed clock signal CLK_ST maintains at the logic high level is smaller than a threshold time Tmeta, the status of the metastable detection signal Meta maintains at the logic low level. The selector 240 still selects the self-timed clock signal CLK_ST as the start signal CLK_CMP. It is noted that the result suffices to explain that under normal conditions, when the first comparator 110 has not entered the metastable state, the start signal CLK_CMP responds to the self-timed clock signal CLK_ST.

Between times T6 and T7, the first comparator 110 still continues to operate in the comparison mode. At this point, since a first input difference ΔVi of the first comparator 110 equals zero, the first comparator 110 is not able to compare and know which first input signal is larger and thus enters the metastable state. That is, the first comparator 110 makes an output voltage difference of the differential output signals Vop and Vom thereof too small. Thereby, a valid comparison signal Valid inside the self-timed clock generator 120 still maintains at the logic low level, so that the self-timed clock signal CLK_ST generated by the self-timed clock generator 120 maintains always at the logic high level, thereby maintaining the start signal CLK_CMP always at the logic high level. Since the metastable detector 230 is controlled by the start signal CLK_CMP, the metastable detector 230 is equivalent to detecting the time interval Tcmp that the self-timed clock signal CLK_ST maintains at the logic high level. During the time T7, the time interval Tcmp is equal to the threshold time Tmeta, and therefore the status of the metastable detection signal Meta is converted from the logic low level to the logic high level, which shows that the first comparator 110 has entered the metastable state. It is noted that the threshold time Tmeta is determined by the metastable detector, and description about an embodiment of the circuit is provided in the following. Next, the selector 240 selects the metastable detection signal Meta as the start signal CLK_CMP, and the start signal CLK_CMP is converted from the logic high level to the logic low level. That is, the first comparator 110 is converted from the comparison mode to the reset mode, and the result shows that the controller 210 indeed helps the first comparator 110 leave the metastable state.

During a time T8, the differential output signals Vop and Vom of the first comparator 110 are reset at the logic high level, so that the valid comparison signal Valid still maintains at the logic low level, and the self-timed clock signal CLK_ST still maintains at the logic high level. Meanwhile, the metastable detection signal Meta generated by the metastable detector 230 is converted from the logic high level to the logic low level, so that the start signal CLK_CMP is converted from the logic low level to the logic high level.

During a time T9, the first comparator 110 enters the comparison mode again and compares the first input difference ΔVi. During a time T10, the self-timed clock generator 120 converts the valid comparison signal Valid from the logic low level to the logic high level based on the comparison result of the first comparator 110, and further converts the self-timed clock signal CLK_ST from the logic high level to the logic low level. Similarly, between the times T9 and T10, since the first comparator 110 has not entered the metastable state, that is, the metastable detector 230 determines that the time interval Tcmp that the self-timed clock signal CLK_ST maintains at the logic high level is smaller than the threshold time Tmeta, the status of the metastable detection signal Meta maintains at the logic low level. During a time T11, the first comparator 110 is converted again from the comparison mode to the reset mode and finishes the present comparison.

It is noted that the time interval Tcmp responds to first input signals Vip and Vin of the first comparator 110, that is, the time interval Tcmp is relevant to the first input difference ΔVi. More specifically, if an absolute value of the first input difference ΔVi between the first input signals Vip and Vin of the first comparator 110 is larger, the first comparator 110 completes the comparison faster, and therefore the time interval Tcmp is shorter. In contrast, if an absolute value of the first input difference ΔVi between the first input signals Vip and Vin of the first comparator 110 is smaller, the first comparator 110 completes the comparison slower, and therefore the time interval Tcmp is longer.

Figure 7A:
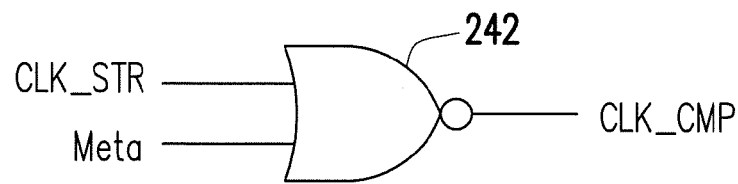
FIGS. 7A and 7B are circuit diagrams of the selector of the signal comparison apparatus as shown in FIG. 5 according to an exemplary embodiment.
Figure 7B:
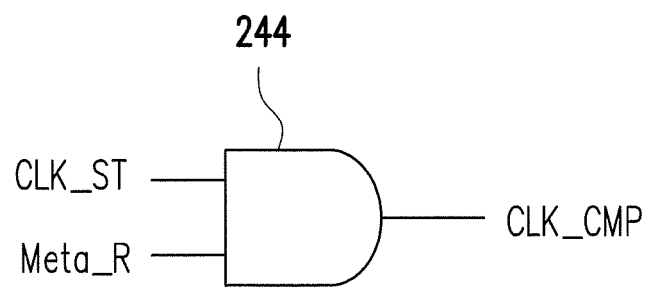

FIGS. 7A and 7B are circuit diagrams of the selector 240 of the signal comparison apparatus 200 as shown in FIG. 5. Referring to FIG. 7A, in the embodiment, the selector 240 may include a NOR-gate 242. The NOR-gate 242 receives an opposite-phase self-timed clock signal CLK_STR and the metastable detection signal Meta to generate the start signal CLK_CMP. Referring to FIG. 7B, in the embodiment, the selector 240 may include an AND-gate 244. The NOR-gate 244 receives the self-timed clock signal CLK_ST and an opposite-phase metastable detection signal Meta_R to generate the start signal CLK_CMP. The selectors 240 disclosed in FIGS. 7A and 7B are merely two examples in the embodiment of the disclosure, but the disclosure is not limited thereto. Based on the timing diagram as shown in FIG. 6, persons having ordinary skills in the art should be able to realize the selectors 240 in the embodiment of the disclosure.

Figure 8:
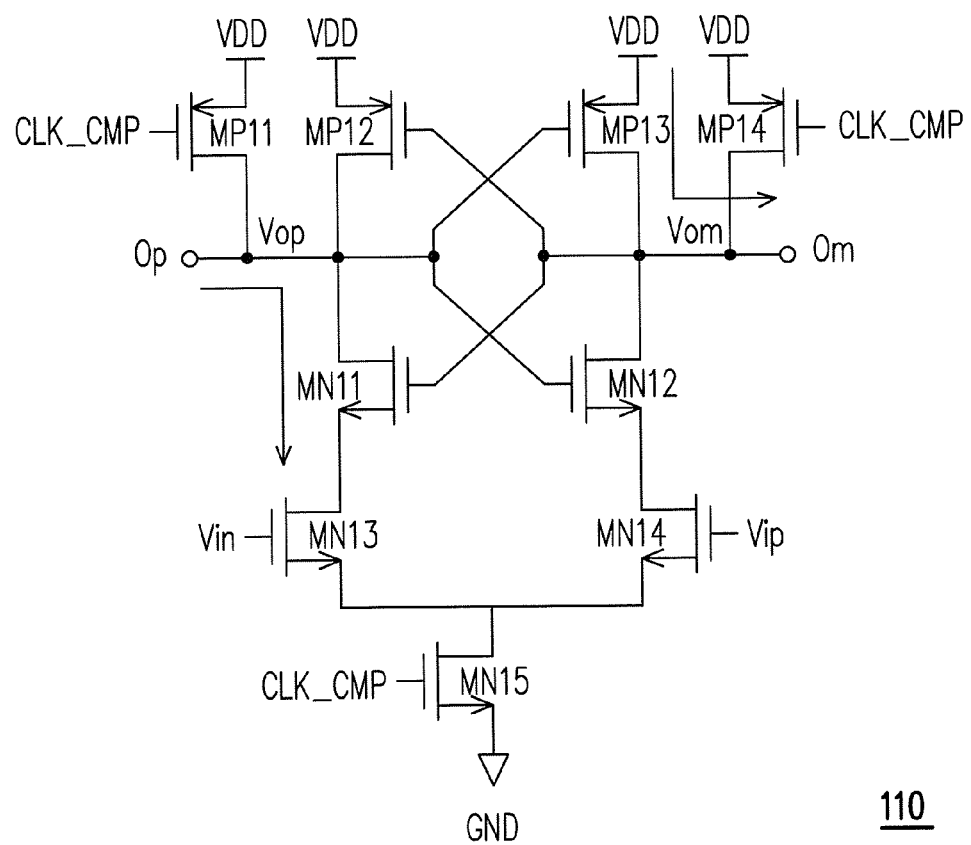
FIG. 8 is a circuit diagram of the first comparator of the signal comparison apparatus as shown in FIG. 5 according to an exemplary embodiment.

Referring to FIG. 8, FIG. 8 is a circuit diagram of the first comparator 110 of the signal comparison apparatus 200 as shown in FIG. 5. The first comparator 110 includes transistors MN11-MN15 and MP11-MP14. A first terminal of the transistor MN15 is coupled to a second terminal of the transistors MN13 and MN14. A second terminal of the transistor MN15 is coupled to a ground potential GND. A control terminal of the transistor MN15 is controlled by the start signal CLK_CMP. Control terminals of the transistors MN13 and MN14 receives the first input signals Vin and Vip respectively. A first terminal of the transistors MN13 and MN14 are respectively coupled to second terminals of the transistors MN11 and MN12. A control terminal of the transistor MN11 is coupled to a control terminal of the transistor MP12, a first terminal of the transistor MN12, a second terminal of the transistor MP13, and a second terminal of the transistor MP14 and connected to a differential output terminal Om of the first comparator. A control terminal of the transistor MN12 is coupled to a control terminal of the transistor MP13, a first terminal of the transistor MN11, a second terminal of the transistor MP11 and a second terminal of the transistor MP12 and connected to a differential output terminal Op of the first comparator. A control terminal of the transistors MP11 and MP14 is controlled by the start signal CLK_CMP. First terminals of the transistors MP11-MP14 are coupled to a source voltage VDD. Herein, the differential output terminals Op and Om are respectively for outputting differential output signals Vop and Vom.

When the first comparator 110 operates in the reset mode, the start signal CLK_CMP is at the logic low level, and therefore the transistor MN15 is turned off while the transistors MP11 and MP14 are turned on, and the differential output signals Vop and Vom are pulled up to the logic high level. When the first comparator 110 enters the comparison mode from the reset mode, the start signal CLK_CMP is converted from the logic low level to the logic high level, and therefore the transistor MN15 is turned on while the transistors MP11 and MP14 are turned off. Herein, it is assumed that a voltage level of the first input signal Vip of the first comparator 110 is obviously smaller than a voltage level of the first input signal Vin. When the first comparator 110 completes the comparison of signals and enters a stable state, the transistors MN11, MN13, MN14, and MP13 are connected while the transistors MN12 and MP12 are cut off. Thereby, the differential output signal Vop discharges from the logic high level to the logic low level; the differential output level Vom maintains at the logic high level.

Figure 9A:
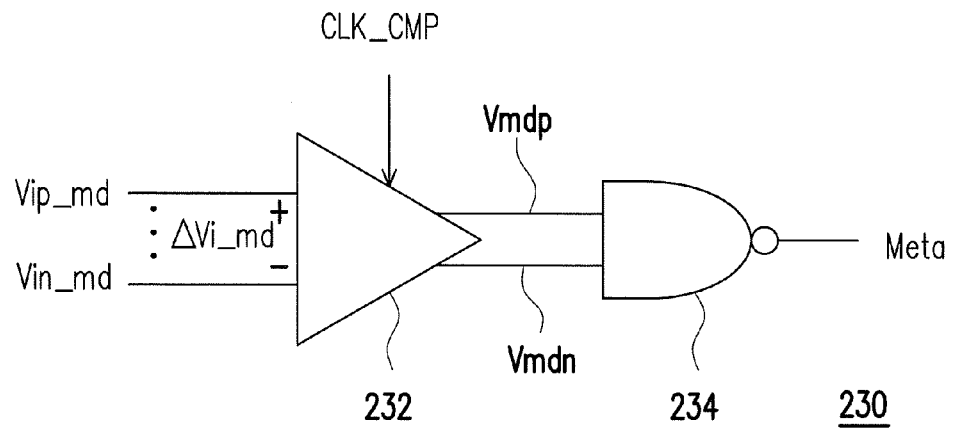
FIGS. 9A, 9B, 9C, and 9D are circuit diagrams of the metastable detector of the signal comparison apparatus as shown in FIG. 5 according to an exemplary embodiment.
Figure 9B:
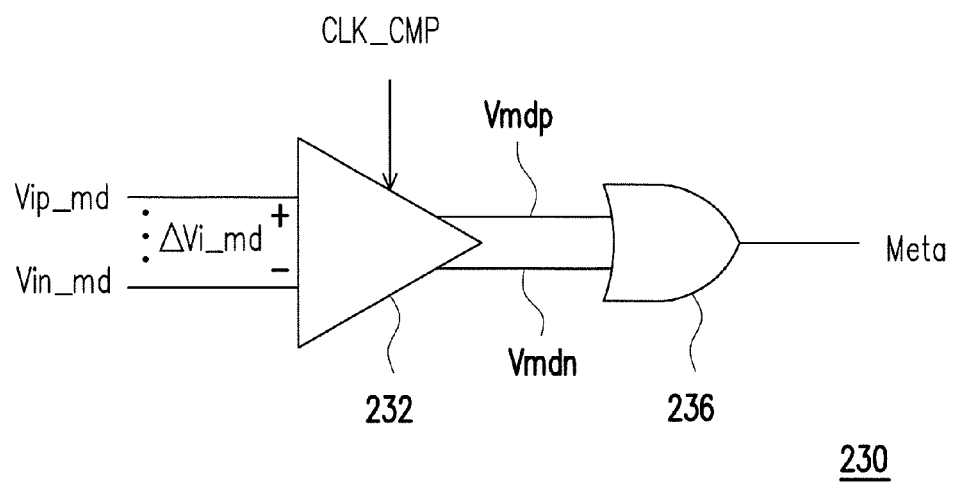

Referring to FIGS. 9A and 9B, FIGS. 9A and 9B are circuit diagrams of the metastable detector 230 of the signal comparison apparatus 200 as shown in FIG. 5. The metastable detector 230 of FIG. 9A includes a second comparator 232 and a NAND-gate 234. The second comparator 232 is controlled by the start signal CLK_CMP. The second comparator 232 receives second input signals Vip_md and Vin_md and compares a difference thereof (hereinafter a second input difference ΔVi_md), thereby generating differential output signals Vmdp and Vmdn. In addition, the second comparator 232 may also compare more than two second input signals, and therefore the disclosure is not limited thereto. The NAND-gate 234 is coupled to the second comparator 232 to receive the differential output signals Vmdp and Vmdn to generate the metastable detection signal Meta. Herein, the NAND-gate 234 may also be realized by other logic gates having the same function. Herein, in the metastable detector 230 of FIG. 9A, it is assumed that the second comparator 232 is in the reset mode while the differential output signals Vmdp and Vmdn of the second comparator 232 are in a Pull-High Reset form.

The metastable detector 230 of FIG. 9B includes a second comparator 232 and an OR-gate 236. The second comparator 232 is controlled by the start signal CLK_CMP to receive second input signals Vip_md and Vin_md and compare a difference thereof (hereinafter a second input difference ΔVi_md), thereby generating differential output signals Vmdp and Vmdn. In addition, the second comparator 232 may also compare more than two second input signals, and therefore the disclosure is not limited thereto. The OR-gate 236 is coupled to the second comparator 232 to receive the differential output signals Vmdp and Vmdn and generate the metastable detection signal Meta. Herein, the OR-gate 236 may also be realized by other logic gates having the same function. Herein, in the metastable detector 230 of FIG. 9B, it is assumed that the second comparator 232 is in the reset mode while the differential output signals Vmdp and Vmdn of the second comparator 232 are in a Pull-Low Reset form.

It is noted that the threshold time Tmeta of the metastable state responds to the second input signals Vip_md and Vin_md of the second comparator, that is, the threshold time Tmeta is relevant to the second input difference ΔVi_md. More specifically, if the absolute value of the second input difference ΔVi_md between the second input signals Vip_md and Vin_md of the second comparator 232 is larger, the threshold time Tmeta of the metastable state set by the second comparator 232 is shorter. In contrast, if the absolute value of the second input difference ΔVi_md between the second input signals Vip_md and Vin_md of the second comparator 232 is smaller, the threshold time Tmeta of the metastable state set by the second comparator 232 is longer.

Figure 9C:
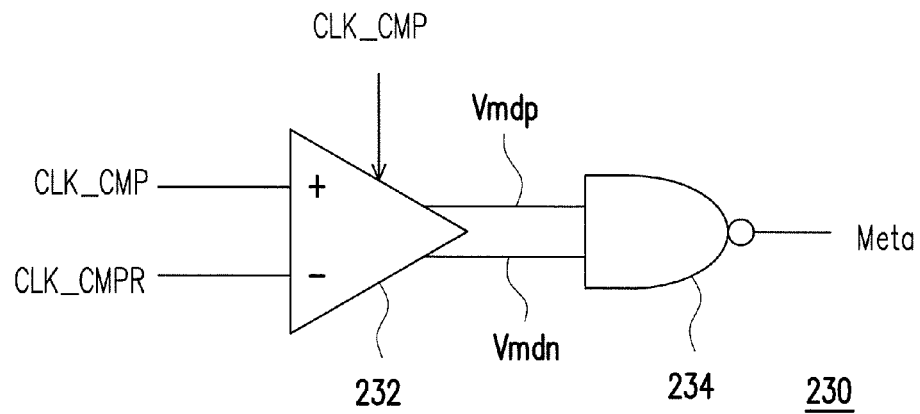
Figure 9D:
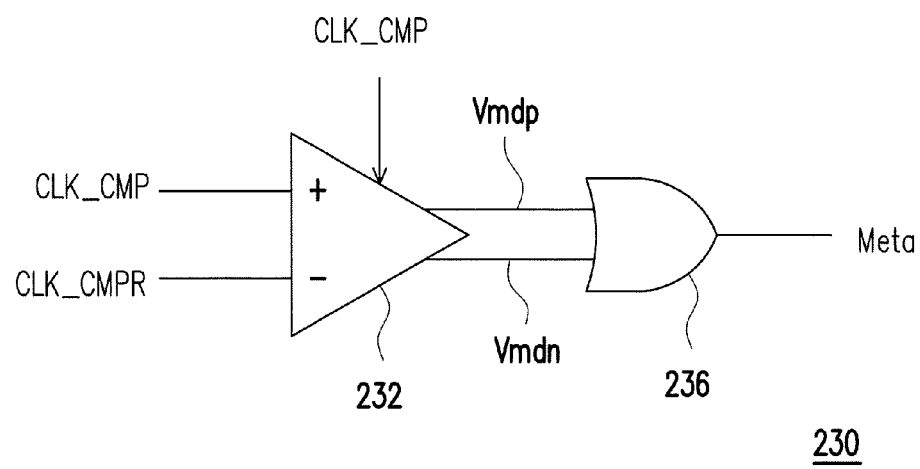

Referring to FIGS. 9C and 9D, FIGS. 9C and 9D are circuit diagrams of the metastable detector 230 of the signal comparison apparatus 200 as shown in FIG. 5. The metastable detector 230 of FIG. 9C includes a second comparator 232 and a NAND-gate 234. The second comparator 232 is controlled by the start signal CLK_CMP. The second input signal Vip_md of the second comparator 232 receives the start signal CLK_CMP, and the second input signal Vin and of the second comparator 232 receives an opposite-phase start signal CLK_CMPR. The second comparator 232 compares the start signal CLK_CMP with the opposite-phase start signal CLK_CMPR and thereby generates differential output signals Vmdp and Vmdn. The NAND-gate 234 is coupled to the second comparator 232 to receive the differential output signals Vmdp and Vmdn to generate the metastable detection signal Meta. Herein, the NAND-gate 234 may also be realized by other logic gates having the same function. Herein, in the metastable detector 230 of FIG. 9C, it is assumed that the second comparator 232 is in the reset mode while the differential output signals Vmdp and Vmdn of the second comparator 232 are in a Pull-High Reset form.

The metastable detector 230 of FIG. 9D includes a second comparator 232 and an OR-gate 236. The second comparator 232 is controlled by the start signal CLK_CMP. The second input signal Vip_md of the second comparator 232 receives the start signal CLK_CMP, and the second input signal Vin and of the second comparator 232 receives an opposite-phase start signal CLK_CMPR. The second comparator 232 compares the start signal CLK_CMP with the opposite-phase start signal CLK_CMPR and thereby generates differential output signals Vmdp and Vmdn. The OR-gate 236 is coupled to the second comparator 232 to receive the differential output signals Vmdp and Vmdn and generate the metastable detection signal Meta. Herein, the OR-gate 236 may also be realized by other logic gates having the same function. Herein, in the metastable detector 230 of FIG. 9D, it is assumed that the second comparator 232 is in the reset mode while the differential output signals Vmdp and Vmdn of the second comparator 232 are in a Pull-Low Reset form.

It is noted that in FIGS. 9C and 9D, since the second input signals compared by the second comparator 232 are respectively the start signal CLK_CMP and the opposite-phase start signal CLK_CMPR, which are large signals and the difference thereof is a voltage value of the source voltage VDD. Therefore, this does not lead the second comparator to enter the metastable state.

Considering operations of the actual circuit, referring back to FIGS. 5 and 6, the time interval Tcmp that the self-timed clock signal CLK_ST maintains at the logic high level, that is, the time interval that the first comparator 110 operates in the comparison mode, may change with the variations in process, voltage supply and temperature under the condition of the same first input difference ΔVi. When the time interval Tcmp changes, if the metastable time Tmeta for determining whether the first comparator 110 enters the metastable state can be changed as well, reliability of the signal comparison apparatus 200 can be maintained while the operating speed of the signal comparison apparatus 200 can be expedited. To achieve this purpose, in the disclosure, the first comparator 100 and the second comparator 232 inside the signal comparison apparatus 200 having the metastable detection mechanism have to be realized with the same architecture. That means, if the comparator structure as in FIG. 8 is adopted in the first comparator 110, the same structure should be adopted in the second comparator 232. Thereby, the metastable detector 230 of the disclosure has the ability to follow the variations in the process, voltage supply and temperature. Thus, the signal comparison apparatus 200 has both high reliability and high operating speed to be used extensively in different operating environments.

In the embodiment as shown in FIG. 5 of the disclosure, a method of replica may be used to reproduce the first comparator 110 to the metastable detector 230, so that the metastable detector 230 has the ability to follow the variations in the process, voltage supply and temperature. In other words, the circuit structures of the second comparator 232 in FIGS. 9A, 9B, 9C and 9D are substantially equivalent to the circuit structure of the first comparator 110 as shown in FIG. 5, or the circuit structure of the second comparator 232 may be a reproduced circuit structure of the first comparator 110. Thereby, the metastable detector 230 has the ability to follow the variations in the process, voltage supply and temperature. Nevertheless, the invention is not limited thereto. In other embodiments of the disclosure, a processing speed of the second comparator 232 should be lower than a processing speed of the first comparator 110 as shown in FIG. 5. Thereby, the time Tmeta (i.e. the threshold time) for the metastable detector 230 to generate the metastable detection signal Meta is equal to or larger than the time interval Tcmp (i.e. the time interval that the first comparator 110 operates in the comparison mode) that the self-timed clock signal CLK_ST maintains at the logic high level, so as to reduce the probability of misjudging that the first comparator 110 enters the metastable state. Description provided below is for the operations in FIG. 9C, and the operations in FIG. 9D may be referred to the description about FIG. 9C.

Figure 10:
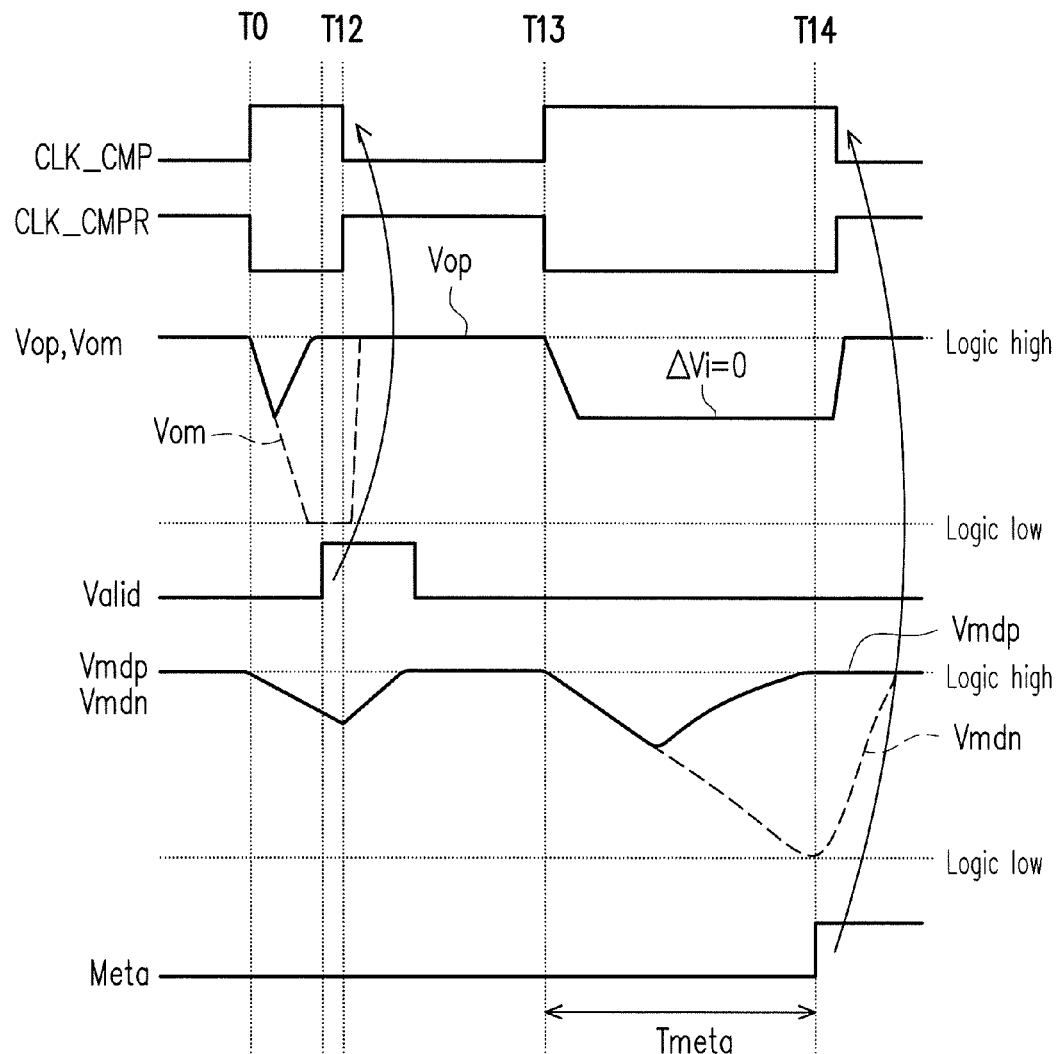
FIG. 10 is a timing diagram of the metastable detector as shown in FIG. 9 according to an exemplary embodiment.

Referring to both FIGS. 5, 9C and 10, FIG. 10 is a timing diagram of the metastable detector 230 as shown in FIG. 9C, and it is assumed herein that the first comparator 110 and second comparator 232 both adopt the circuit structure of the comparator as depicted in FIG. 8. Herein, the processing speed of the second comparator 232 is lower than the processing speed of the first comparator 110. Nevertheless, the invention is not limited thereto.

Before a time T0, since the start signal CLK_CMP is at the logic low level, the first comparator 110 and the second comparator 232 both operate in the reset mode. At this point, the differential output signals Vop and Vom of the first comparator 110 are reset to the logic high level, and therefore the valid comparison signal Valid is at the logic low level. In addition, the differential output signals Vmdp and Vmdn of the second comparator 232 are also reset to the logic high level. Therefore, the metastable detection signal Meta is at the logic low level.

During a time T0, the start signal CLK_CMP is converted from the logic low level to the logic high level, and therefore the first comparator 110 and the second comparator 232 begin to operate in the comparison mode. At this point, the second comparator 232 begins to compare the start signal CLK_CMP with the opposite-phase start signal CLK_CMPR to generate the differential output signals Vmdp and Vmdn. Since a voltage difference between the start signal CLK_CMP and the opposite-phase start signal CLK_CMPR is larger than 0, the differential output signals Vmdp and Vmdn of the second comparator 232, with sufficient response time, are pulled respectively to the logic high level and the logic low level after a transient state.

During a time T12, since the first comparator 110 has completed the comparison of the first input signals Vip and Vin, the differential output signal Vop and Vom have been risen to the logic high level and dropped to the logic low level respectively. At this point, the valid comparison signal Valid inside the self-timed clock generator 120 indicates that the first comparator 110 has completed the comparison, and therefore the self-timed clock signal CLK_ST from the self-timed clock generator 120 is converted from the logic high level to the logic low level.

It is noted that the processing speed of the second comparator 232 is lower than the processing speed of the first comparator 110. Therefore, when the first comparator 110 has completed the comparison (in the time T12), the differential output signals Vmdp and Vmdn of the second comparator 232 may still stay in the transient state. Or, a voltage level of the differential output signal Vmdp has not been risen to the logic high level, and a voltage level of the differential output signal Vmdn has not been dropped to the logic low level. Thereby, the metastable detection signal Meta generated by the NAND-gate 234 continues to maintain at the logic low level. That is, between the times T0 and T12, the first comparator 110 does not enter the metastable state. Therefore, during the time T12, the selector 240 selects the self-timed clock signal CLK_ST as the start signal CLK_CMP, so that the first comparator 110 and the second comparator 232 enter the reset mode. At this point, the differential output signals Vmdp and Vmdn of the second comparator 232 are reset again to the logic high level.

During a time T13, the first comparator 110 and the second comparator 232 again operate in the comparison mode, and the operation is the same as the operation in the time T0, which is not described repeatedly herein. Between times T13 and T14, while the first comparator 110 compares the first input signals Vip and Vin, the second comparator 232 compares the start signal CLK_CMP and the opposite-phase start signal CLK_CMPR. Since the voltage difference between the start signal CLK_CMP and the opposite-phase start signal CLK_CMPR is larger than 0, the differential output signal Vmdp of the second comparator 232 begins to be risen to the logic high level after the transient state while the differential output signal Vmdn begins to drop to the logic low level after the transient state.

Until a time T14, the first comparator 110 is still not able to complete the comparison of the first input signals Vip and Vin. However, the second comparator 232 at this point has completed the comparison of the start signal CLK_CMP and the opposite-phase start signal CLK_CMPR. That is, the differential output signal Vmdp of the second comparator 232 has been risen to the logic high level after the transient state while the differential output signal Vmdn has been dropped to the logic low level after the transient state. Herein, a time interval between the times T13 and T14 is the threshold time Tmeta. Therefore, the metastable detection signal Meta generated by the NAND-gate 234 is converted from the logic low level to the logic high level. The result shows that the first comparator 110 has entered the metastable state.

Operation after the time T14 in FIG. 10 (i.e. after the first comparator 110 enters the metastable state) is similar to the operation during the time T7 in FIG. 6, and therefore the detailed operation may be referred to the description about the time T7 in FIG. 6, which is not repeated herein.

Figure 11:
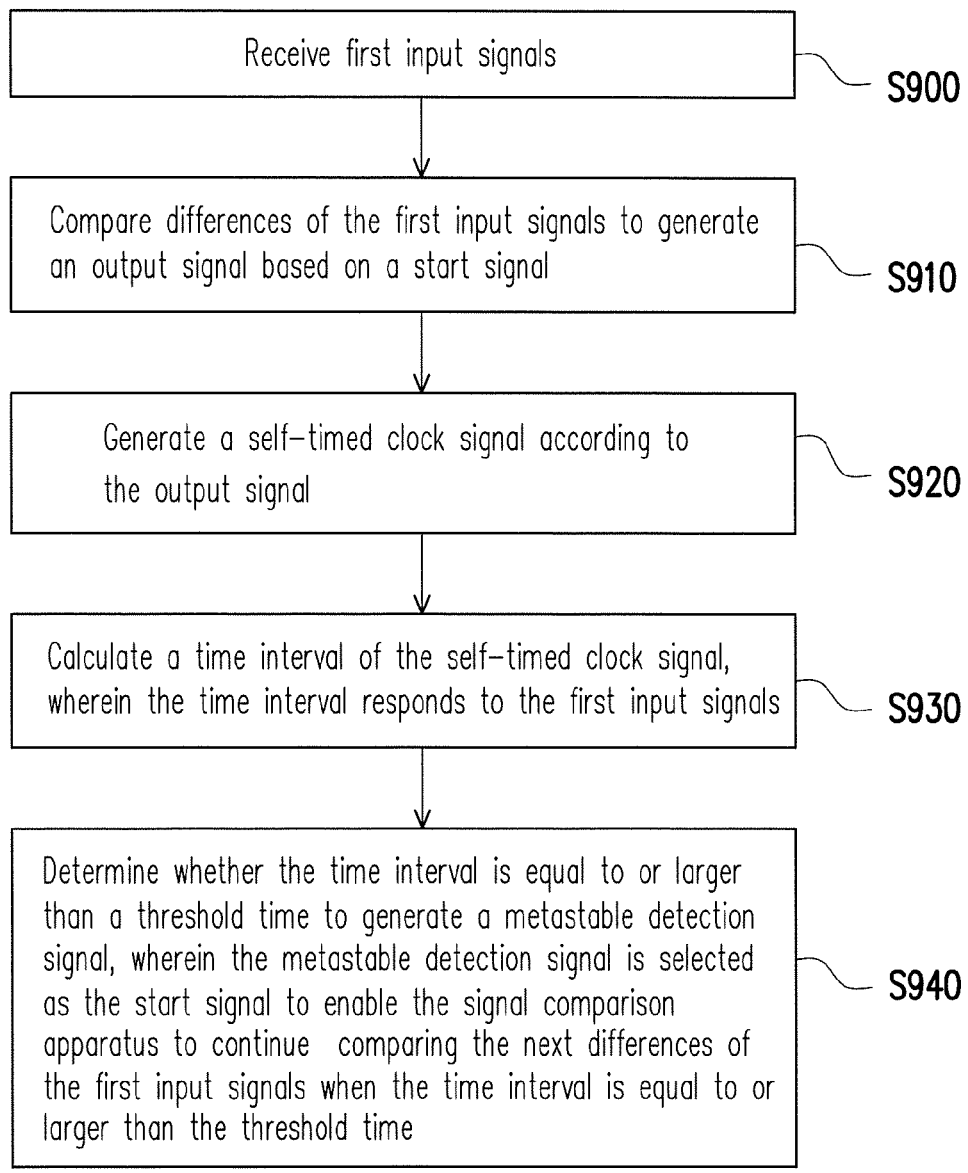
FIG. 11 illustrates a flowchart of steps of a method of controlling a signal comparison apparatus according to an exemplary embodiment.

In addition, a method of controlling a signal comparison apparatus is further provided in another embodiment of the disclosure. As shown in FIG. 11, FIG. 11 illustrates a flowchart of steps of a method of controlling a signal comparison apparatus according to an embodiment of the disclosure. Referring to both FIGS. 5 and 11, a method of controlling the signal comparison apparatus 200 includes the following steps. First, in step S900, first input signals Vip and Vin are received. Next, in step S910, the first input signals Vip and Vin are compared to generate output signals Vop and Vom based on a start signal CLK_CMP. Then, in step S920, a self-timed clock signal CLK_ST is generated according to the output signals Vop and Vom. After that, in step S930, a time interval of the self-timed clock signal CLK_ST is calculated, wherein the time interval responds to the first input signals Vip and Vin. Finally, in step S940, it is determined whether the time interval is equal to or larger than a threshold time to generate a metastable detection signal Meta. When the time interval is equal to or larger than the threshold time, the metastable detection signal Meta is selected as the start signal CLK_CMP, such that the signal comparison apparatus 200 continues to compare the next difference between the first input signals Vip and Vin. When the time interval is smaller than the threshold time, the self-timed clock signal CLK_ST is selected as the start signal CLK_CMP.

In addition, the embodiments of FIGS. 1 to 10 provide sufficient teachings, suggestions and description about implementation for the method of controlling the signal comparison apparatus in the embodiment of the disclosure, so further reiteration is not provided herein.

In view of the above, the signal comparison apparatus and the method of controlling the same introduced in the embodiments of the disclosure is able to generate the self-timed clock signal via the self-timed clock generator inside the signal comparison apparatus, and therefore may be applied to a self-timed comparison system. In addition, the signal comparison apparatus is able to generate the metastable detection signal based on the time interval of the self-timed clock signal, wherein the time interval responds to the first input signal of the first comparator. When the time interval is equal to or larger than the threshold time, the metastable detection signal is selected as the start signal, such that the first comparator leaves the metastable state to continue comparing the next differences of the first input signals. That means, when the signal comparison apparatus enters the metastable state, the self-timed clock signal maintains at a specific voltage level for a long time. The disclosure is able to calculate the time that the self-timed clock signal stays at the specific voltage level and resets the first comparator when the time is too long, so that the first comparator leaves the metastable state. Thereby, the signal comparison apparatus can be prevented from entering the metastable state for a long time, which affects the timing and correctness of the self-timed comparison system, and the BER during high-speed operation is reduced. In addition, the metastable detector in the signal comparison apparatus introduced in the embodiment of the disclosure merely needs to detect the output signal of the first comparator, and therefore loading on the path of an analog signal, signal disturbance and complexity of an analog circuit are reduced. Furthermore, in the embodiments of the disclosure, the circuit structure of the second comparator in the metastable detector may be an equivalent architecture of the first comparator, so that the metastable detector has the ability of following the variations in the process, voltage supply, and temperature. Therefore, the signal comparison apparatus and the method of controlling the same introduced in the embodiments of the disclosure enhance the reliability of the circuit and are applicable to various operation environments extensively.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A signal comparison apparatus, comprising:
a first comparator, configured to receive at least two first input signals and be controlled by a start signal to compare differences of the at least two first input signals to generate an output signal based on the start signal;
a self-timed clock generator, coupled to the first comparator and configured to receive the output signals and generate a self-timed clock signal according to the output signals; and
a controller, coupled to the self-timed clock generator and configured to receive the self-timed clock signal, calculate a time interval of the self-timed clock signal and determine whether the time interval is equal to or larger than a threshold time to generate a metastable detection signal, wherein the time interval responds to the at least two first input signals, and the controller outputs the metastable detection signal as the start signal when the time interval is equal to or larger than the threshold time, so as to enable the first comparator to continue comparing the next differences of the at least two first input signals.

2. The signal comparison apparatus as recited in claim 1, wherein the controller further receives at least two second input signals, and the controller comprises:
a metastable detector, configured to receive the start signal or the at least two second input signals to generate the metastable detection signal, wherein the start signal responds to the self-timed clock signal, and the metastable detector calculates the time interval in which the self-timed clock signal is located at a voltage level and determines whether the time interval is equal to or larger than the threshold time to generate the metastable detector; and
a selector, configured to receive the self-timed clock signal and coupled to the metastable detector to receive the metastable detection signal, wherein the selector selects the metastable detection signal as the start signal when the time interval of the self-timed clock signal is equal to or larger than the threshold time, or the selector selects the self-timed clock signal as the start signal;
wherein the threshold time responds to the start signal or the at least two second input signals.

3. The signal comparison apparatus as recited in claim 2, wherein the metastable detector comprises:
a second comparator, configured to receive the start signal and the start signal with an opposite phase and be controlled by the start signal, wherein the start signal and the start signal with the opposite phase are compared based on the start signal to generate a differential output signal; and
a logic gate, coupled to the second comparator and configured to receive the differential output signal and perform logic operation on the differential output signal to generate the metastable detection signal.

4. The signal comparison apparatus as recited in claim 3, wherein the logic gate comprises a NAND-gate or an OR-gate.

5. The signal comparison apparatus as recited in claim 3, wherein a circuit structure of the second comparator is substantially equivalent to the circuit structure of the first comparator.

6. The signal comparison apparatus as recited in claim 5, wherein a processing speed of the second comparator is lower than the processing speed of the first comparator.

7. The signal comparison apparatus as recited in claim 2, wherein the metastable detector comprises:
a second comparator, configured to receive at least two second input signals and be controlled by the start signal to compare differences of the at least two second input signals, so as to generate a differential output signal; and
a logic gate, coupled to the second comparator configured to receive the differential output signal and perform logic operation on the differential output signal to generate the metastable detection signal.

8. The signal comparison apparatus as recited in claim 7, wherein the logic gate comprises a NAND-gate or an OR-gate.

9. The signal comparison apparatus as recited in claim 7, wherein a circuit structure of the second comparator is substantially equivalent to the circuit structure of the first comparator.

10. The signal comparison apparatus as recited in claim 9, wherein a processing speed of the second comparator is lower than the processing speed of the first comparator.

11. The signal comparison apparatus as recited in claim 2, wherein the selector comprises:
a NOR-gate, configured to receive the self-timed clock signal with an opposite-phase and the metastable detection signal to generate the start signal.

12. The signal comparison apparatus as recited in claim 2, wherein the selector comprises:
an AND-gate, configured to receive the self-timed clock signal and the metastable detection signal with an opposite-phase to generate the start signal.

13. The signal comparison apparatus as recited in claim 1, wherein the output signal is a differential output signal.

14. The signal comparison apparatus as recited in claim 13, wherein the self-timed clock generator further receives an enable signal, and the self-timed clock generator comprises:
an OR-gate, configured to receive the differential output signal to generate a valid comparison signal; and
a NOR-gate, configured to receive the enable signal, and coupled to the OR-gate to receive the valid comparison signal and generate the self-timed clock signal.

15. The signal comparison apparatus as recited in claim 13, wherein the self-timed clock generator further receives an enable signal, and the self-timed clock generator comprises:
a NAND-gate, configured to receive the differential output signal to generate a valid comparison signal; and
a NOR-gate, configured to receive the enable signal, and coupled to the NAND-gate to receive the valid comparison signal and generate the self-timed clock signal.

16. A method of controlling a signal comparison apparatus, comprising:
receiving at least two first input signals;
comparing differences of the at least two first input signals to generate an output signal based on a start signal;
generating a self-timed clock signal according to the output signal;
calculating a time interval of the self-timed clock signal, wherein the time interval responds to the at least two first input signals; and
determining whether the time interval is equal to or larger than a threshold time to generate a metastable detection signal;
wherein the metastable detection signal is selected as the start signal when the time interval is equal to or larger than the threshold time, so as to enable the signal comparison apparatus to continue comparing the next differences of the at least two first input signals.

17. The method of controlling the signal comparison apparatus as recited in claim 16, wherein the method for generating the start signal further comprises:
selecting the self-timed clock signal as the start signal when the time interval is smaller than the threshold time.

18. The method of controlling the signal comparison apparatus as recited in claim 17, further comprising:
receiving at least two second input signals;
wherein the threshold time responds to the start signal or the at least two second input signals.

19. The method of controlling the signal comparison apparatus as recited in claim 18, wherein the threshold time responds to a difference between the at least two second input signals,
the threshold time being shorter when the difference between the at least two second input signals is larger; and
the threshold time being longer when the difference between the at least two second input signals is smaller.

20. The method of controlling the signal comparison apparatus as recited in claim 16, wherein the method for generating the start signal comprises:
performing a logical NOR operation on the self-timed clock signal with an opposite phase and the metastable detection signal to generate the start signal.

21. The method of controlling the signal comparison apparatus as recited in claim 16, wherein the method for generating the start signal comprises:
performing a logical AND operation on the self-timed clock signal and the opposite-phase metastable detection signal to generate the start signal.

22. The method of controlling the signal comparison apparatus as recited in claim 16, wherein the output signal is a differential output signal.

23. The method of controlling the signal comparison apparatus as recited in claim 22, further comprising:
receiving an enable signal,
wherein the method of generating the self-timed clock signal comprises:
performing a logical OR operation on the differential output signal to generate a valid comparison signal; and
performing a logical NOR operation on the enable signal and the valid comparison signal to generate the self-timed clock signal.

24. The method of controlling the signal comparison apparatus as recited in claim 22, further comprising:
receiving an enable signal,
wherein the method of generating the self-timed clock signal comprises:
performing a logical NAND operation on the differential output signal to generate a valid comparison signal; and
performing a logical NOR operation on the Enable signal and the valid comparison signal to generate the self-timed clock signal.

* * * * *